US 9,521,456 B2

(12) United States Patent
Fuhrer

(10) Patent No.: US 9,521,456 B2
(45) Date of Patent: *Dec. 13, 2016

(54) METHODS, APPARATUS, AND SYSTEMS TO COLLECT AUDIENCE MEASUREMENT DATA

(71) Applicant: The Nielsen Company (US), LLC, Schaumburg, IL (US)

(72) Inventor: Brian Shane Fuhrer, Palm Harbor, FL (US)

(73) Assignee: The Nielsen Company (US), LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/724,401

(22) Filed: May 28, 2015

(65) Prior Publication Data

US 2015/0264430 A1 Sep. 17, 2015

Related U.S. Application Data

(63) Continuation of application No. 14/144,341, filed on Dec. 30, 2013, now Pat. No. 9,055,334, which is a
(Continued)

(51) Int. Cl.
*H04N 21/442* (2011.01)
*H04H 60/31* (2008.01)
(Continued)

(52) U.S. Cl.
CPC ........ *H04N 21/44204* (2013.01); *H04H 60/31* (2013.01); *H04H 60/45* (2013.01);
(Continued)

(58) Field of Classification Search
CPC ................... H04N 21/44213; H04N 21/44218
See application file for complete search history.

(56) References Cited

U.S. PATENT DOCUMENTS 4,626,904 A 12/1986 Lurie
4,658,290 A 4/1987 McKenna et al.
(Continued)

FOREIGN PATENT DOCUMENTS

AU 2003253598 11/2003
CA 2306095 6/1999
(Continued)

OTHER PUBLICATIONS

United States Patent and Trademark Office, Non-Final Office Action, issued in connection with U.S. Appl. No. 12/887,275, dated Mar. 6, 2013 (16 pages).
(Continued)

*Primary Examiner* — Robert Hance
(74) *Attorney, Agent, or Firm* — Hanley, Flight & Zimmerman, LLC

(57) ABSTRACT

Methods, apparatus, and systems to collect audience measurement data are disclosed. A disclosed example method includes collecting first media data. Audience identification data is collected with a people meter. Audience member behavior is developed data based on the first media data and the audience identification data. Second media data is collected after the people meter has been removed, the removal of the people meter occurring after the audience member behavior data has been developed. Audience members associated with the second media data are identified based on the audience member behavior data.

18 Claims, 12 Drawing Sheets

Related U.S. Application Data continuation of application No. 12/887,275, filed on Sep. 21, 2010, now Pat. No. 8,677,385.

(51) Int. Cl.
| | |
|---|---|
| *H04H 60/45* | (2008.01) |
| *H04N 21/658* | (2011.01) |
| *H04N 21/258* | (2011.01) |
| *H04H 60/46* | (2008.01) |
| *H04H 60/66* | (2008.01) |

(52) U.S. Cl.
CPC . *H04N 21/25883* (2013.01); *H04N 21/25891* (2013.01); *H04N 21/44213* (2013.01); *H04N 21/44218* (2013.01); *H04N 21/44222* (2013.01); *H04N 21/6582* (2013.01); *H04H 60/46* (2013.01); *H04H 60/66* (2013.01)

(56) References Cited

U.S. PATENT DOCUMENTS

| | | |
|---|---|---|
| 4,695,879 A | 9/1987 | Weinblatt |
| 4,769,697 A | 9/1988 | Gilley et al. |
| 4,779,198 A | 10/1988 | Lurie |
| 4,843,631 A | 6/1989 | Steinpichler et al. |
| 4,849,737 A | 7/1989 | Kirihata et al. |
| 4,858,000 A | 8/1989 | Lu |
| 4,907,079 A | 3/1990 | Turner et al. |
| 4,930,011 A | 5/1990 | Kiewit |
| 4,931,865 A | 6/1990 | Scarampi |
| 5,121,201 A | 6/1992 | Seki |
| 5,229,764 A | 7/1993 | Matchett et al. |
| 5,251,324 A | 10/1993 | McMullan, Jr. |
| 5,267,323 A | 11/1993 | Kimura |
| 5,303,299 A | 4/1994 | Hunt et al. |
| 5,373,315 A * | 12/1994 | Dufresne ............ H04N 21/812 725/11 |
| 5,412,738 A | 5/1995 | Brunelli et al. |
| 5,457,807 A | 10/1995 | Weinblatt |
| 5,481,294 A | 1/1996 | Thomas et al. |
| 5,497,185 A | 3/1996 | Dufresne et al. |
| 5,550,928 A * | 8/1996 | Lu ..................... G06K 9/00221 382/103 |
| 5,564,088 A | 10/1996 | Saitoh |
| 5,615,296 A | 3/1997 | Stanford et al. |
| 5,749,043 A | 5/1998 | Worthy |
| 5,765,130 A | 6/1998 | Nguyen |
| 5,774,859 A | 6/1998 | Houser et al. |
| 5,812,732 A | 9/1998 | Dettmer et al. |
| 5,945,988 A | 8/1999 | Williams et al. |
| 5,977,964 A | 11/1999 | Williams et al. |
| 5,991,735 A | 11/1999 | Gerace |
| 5,999,689 A | 12/1999 | Iggulden |
| 6,002,443 A | 12/1999 | Iggulden |
| 6,100,941 A | 8/2000 | Dimitrova et al. |
| 6,184,918 B1 | 2/2001 | Goldschmidt Iki et al. |
| 6,289,514 B1 | 9/2001 | Link et al. |
| 6,404,977 B1 | 6/2002 | Iggulden |
| 6,467,089 B1 * | 10/2002 | Aust ..................... H04H 60/37 455/2.01 |
| 6,606,605 B1 | 8/2003 | Kolls |
| 6,647,548 B1 | 11/2003 | Lu et al. |
| 6,651,043 B2 | 11/2003 | Ammicht et al. |
| 6,708,335 B1 | 3/2004 | Ozer et al. |
| 6,741,684 B2 | 5/2004 | Kaars |
| 6,944,447 B2 | 9/2005 | Portman et al. |
| 7,089,575 B2 | 8/2006 | Agnihotri et al. |
| 7,134,130 B1 | 11/2006 | Thomas |
| 7,155,159 B1 | 12/2006 | Weinblatt et al. |
| 7,181,159 B2 | 2/2007 | Breen |
| 7,203,338 B2 | 4/2007 | Ramaswamy et al. |
| 7,248,777 B2 | 7/2007 | Feininger et al. |
| 7,353,171 B2 | 4/2008 | Srinivasan |
| 7,466,844 B2 | 12/2008 | Ramaswamy et al. |
| 7,609,853 B2 | 10/2009 | Ramaswamy et al. |
| 7,702,813 B2 * | 4/2010 | Andreasson ........... G06Q 30/02 709/245 |
| 7,752,042 B2 | 7/2010 | Srinivasan |
| 7,882,514 B2 | 2/2011 | Nielsen et al. |
| 8,023,882 B2 | 9/2011 | Croy et al. |
| 8,091,100 B2 | 1/2012 | Donato |
| 8,194,923 B2 | 6/2012 | Ramaswamy et al. |
| 8,225,342 B2 | 7/2012 | Mears et al. |
| 8,302,120 B2 | 10/2012 | Ramaswamy |
| 8,677,385 B2 | 3/2014 | Fuhrer |
| 9,055,334 B2 | 6/2015 | Fuhrer |
| 2002/0010919 A1 | 1/2002 | Lu et al. |
| 2002/0056087 A1 | 5/2002 | Berezowski et al. |
| 2002/0059577 A1 | 5/2002 | Lu et al. |
| 2002/0129360 A1 | 9/2002 | Lee |
| 2002/0129362 A1 * | 9/2002 | Chang ................. H04N 7/17318 725/32 |
| 2002/0194586 A1 | 12/2002 | Gutta et al. |
| 2002/0198762 A1 | 12/2002 | Donato |
| 2004/0058675 A1 | 3/2004 | Lu et al. |
| 2005/0144632 A1 | 6/2005 | Mears et al. |
| 2005/0216509 A1 | 9/2005 | Kolessar et al. |
| 2006/0062429 A1 | 3/2006 | Ramaswamy et al. |
| 2006/0168613 A1 | 7/2006 | Wood et al. |
| 2006/0195857 A1 | 8/2006 | Wheeler et al. |
| 2006/0200841 A1 | 9/2006 | Ramaswamy et al. |
| 2007/0050832 A1 | 3/2007 | Wright et al. |
| 2007/0294705 A1 | 12/2007 | Gopalakrishnan et al. |
| 2008/0109295 A1 | 5/2008 | McConochie et al. |
| 2008/0127253 A1 * | 5/2008 | Zhang ................. H04N 21/478 725/35 |
| 2008/0148307 A1 | 6/2008 | Nielsen et al. |
| 2009/0037575 A1 | 2/2009 | Crystal et al. |
| 2009/0171767 A1 | 7/2009 | Kolessar |
| 2009/0265729 A1 | 10/2009 | Weinblatt |
| 2009/0290756 A1 | 11/2009 | Ramaswamy et al. |
| 2010/0269127 A1 | 10/2010 | Krug |
| 2010/0274372 A1 | 10/2010 | Nielsen et al. |
| 2012/0089996 A1 * | 4/2012 | Ramer ................. H04H 60/46 725/14 |
| 2012/0213410 A1 | 8/2012 | Ramaswamy et al. |
| 2012/0254908 A1 | 10/2012 | Mears et al. |
| 2012/0324496 A1 | 12/2012 | Donato |
| 2013/0024275 A1 | 1/2013 | Ramaswamy |

FOREIGN PATENT DOCUMENTS

| | | |
|---|---|---|
| EP | 0231427 | 8/1987 |
| EP | 0262757 | 4/1988 |
| EP | 1026847 | 8/2000 |
| EP | 1133090 | 9/2001 |
| EP | 1326185 | 7/2003 |
| JP | 2005086308 | 3/2005 |
| WO | 9831114 | 7/1998 |
| WO | 9927668 | 6/1999 |
| WO | 9933206 | 7/1999 |
| WO | 0072484 | 11/2000 |
| WO | 03095945 | 11/2003 |
| WO | 2004051997 | 6/2004 |
| WO | 2004053791 | 6/2004 |
| WO | 2004054255 | 6/2004 |
| WO | 2005071961 | 8/2005 |

OTHER PUBLICATIONS

United States Patent and Trademark Office, Notice of Allowance, issued in connection with U.S. Appl. No. 12/887,275, dated Jul. 3, 2013 (12 pages).

United States Patent and Trademark Office, Notice of Allowance, issued in connection with U.S. Appl. No. 12/887,275, dated Oct. 17, 2013 (10 pages).

United States Patent and Trademark Office, Non-Final Office Action, issued in connection with U.S. Appl. No. 14/144,341, dated Jul. 16, 2014 (7 pages).

United States Patent and Trademark Office, Notice of Allowance, issued in connection with U.S. Appl. No. 14/144,341, dated Feb. 10, 2015 (9 pages).

(56) References Cited

OTHER PUBLICATIONS

United States Patent and Trademark Office, Non-Final Office Action, issued in connection with U.S. Appl. No. 14/724,401, dated Dec. 15, 2015 (9 pages).

* cited by examiner

| TUESDAY FEBUARY 16, 2010 | | PROGRAM IDENTIFICATION DATA | | |
|---|---|---|---|---|
| TIME PERIOD | SELF-IDENTIFIED AUDIENCE MEMBERS | TITLE | GENRE | CHANNEL |
| 8:00-9:00 P.M. | BF01 | LAW AND ORDER - SVU | POLICE-DRAMA | USA |
| 9:00-9:30 P.M. | BF01<br>DF01<br>SF01 | LOST | ACTION-ADVENTURE-FANTASY | ABC |
| 9:30-10:00 P.M. | DF01<br>SF01 | LOST | ACTION-ADVENTURE-FANTASY | ABC |
| 10:00-11:00 P.M. | SF01<br>BF01 | DEADLIEST CATCH | REALITY | DISCOVERY |
| 11:00-11:20 P.M. | DF01 | EVENING NEWS | NEWS | NBC |

| BEHAVIOR DATA : JANUARY 15, 2009 - JANUARY 15, 2011 | | | | | |
|---|---|---|---|---|---|
| PANELIST | TIMES | DAYS | TITLES | GENRES | CHANNELS |
| BF01 | 8:00-9:00 P.M.<br>1:00-3:00 P.M.<br>10:00-11:00 P.M. | M, T, W<br>T, TH<br>SA | LAW & ORDER - SVU<br>DEADLIEST CATCH<br>COLLEGE BASKETBALL<br>IRON CHEF AMERICA<br>NBA | POLICE-DRAMA<br>ACTION<br>ADVENTURE<br>REALITY<br>SPORTS | USA<br>DISCOVERY<br>CBS<br>ESPN<br>ABC<br>FOOD |
| DF01 | 9:00 - 10:00 P.M.<br>11:00 - 11:35 P.M.<br>7:00 - 8:00 P.M.<br>8:00-9:00 P.M. | T, W<br>M,T, W, TH<br>F<br>SU | LOST<br>EVENING NEWS<br>AMAZING RACE<br>HOUSE HUNTERS INTL.<br>GOOD EATS<br>THE OFFICE<br>30 ROCK | NEWS<br>REALITY<br>COOKING<br>COMEDY | NBC<br>FOOD<br>HGTV<br>CBS<br>ABC |
| SF01 | 9:00-10:00 P.M.<br>10:00-11:00 P.M.<br>8:00 - 9:00 P.M.<br>1:00 - 6:00 P.M.<br>8:00 - 9:00 P.M. | T, W<br>T, TH<br>S<br>SU<br>M | LOST<br>DEADLIEST CATCH<br>NFL<br>FAMILY GUY<br>24 | ACTION<br>ADVENTURE<br>FANTASY<br>COMEDY | ABC<br>DISCOVERY<br>CBS<br>FOX |

FIG. 7

METHODS, APPARATUS, AND SYSTEMS TO COLLECT AUDIENCE MEASUREMENT DATA

RELATED APPLICATION

This patent arises from a continuation of U.S. patent application Ser. No. 14/144,341, which was filed on Dec. 30, 2013 and issued on Jun. 9, 2015, as U.S. Pat. No. 9,055,334, which claims priority from U.S. Pat. No. 8,677,385, which was filed on Sep. 21, 2010, and was granted on Mar. 18, 2014. U.S. Pat. No. 8,677,385 and U.S. patent application Ser. No. 14/144,341 are hereby incorporated herein by reference in their entireties.

FIELD OF THE DISCLOSURE

The present disclosure relates generally to audience measurement, and more particularly, to methods, apparatus, and systems to collect audience measurement data.

BACKGROUND

Determining the size and specific demographics of a television viewing audience helps television content providers and distributors schedule television programming and determine a price for advertising during the programming. In addition, accurate estimates of television viewing demographics enable advertisers to target certain types and sizes of audiences. To collect these demographics, an audience measurement company enlists a plurality of television viewers to cooperate in an audience measurement study for a predefined length of time. The viewing habits and demographic data associated with these enlisted viewers is collected and used to statistically determine the size and demographics of a television viewing audience. In some examples, automatic measurement systems may be supplemented with survey information recorded manually by the viewing audience members.

The process of enlisting and retaining participants for purposes of audience measurement may be a difficult and costly aspect of the audience measurement process. For example, participants are typically carefully selected and screened for particular characteristics so that the population of participants is representative of the overall viewing population. Additionally, the participants are required to perform specific tasks that enable the collection of the data, such as, for example, periodically self-identifying while viewing television programming.

BRIEF DESCRIPTION OF THE DRAWINGS

FIG. 7 shows a table of behavior data compiled by the example base metering device of FIG. 5 during a time period.

DETAILED DESCRIPTION

Figure 1:
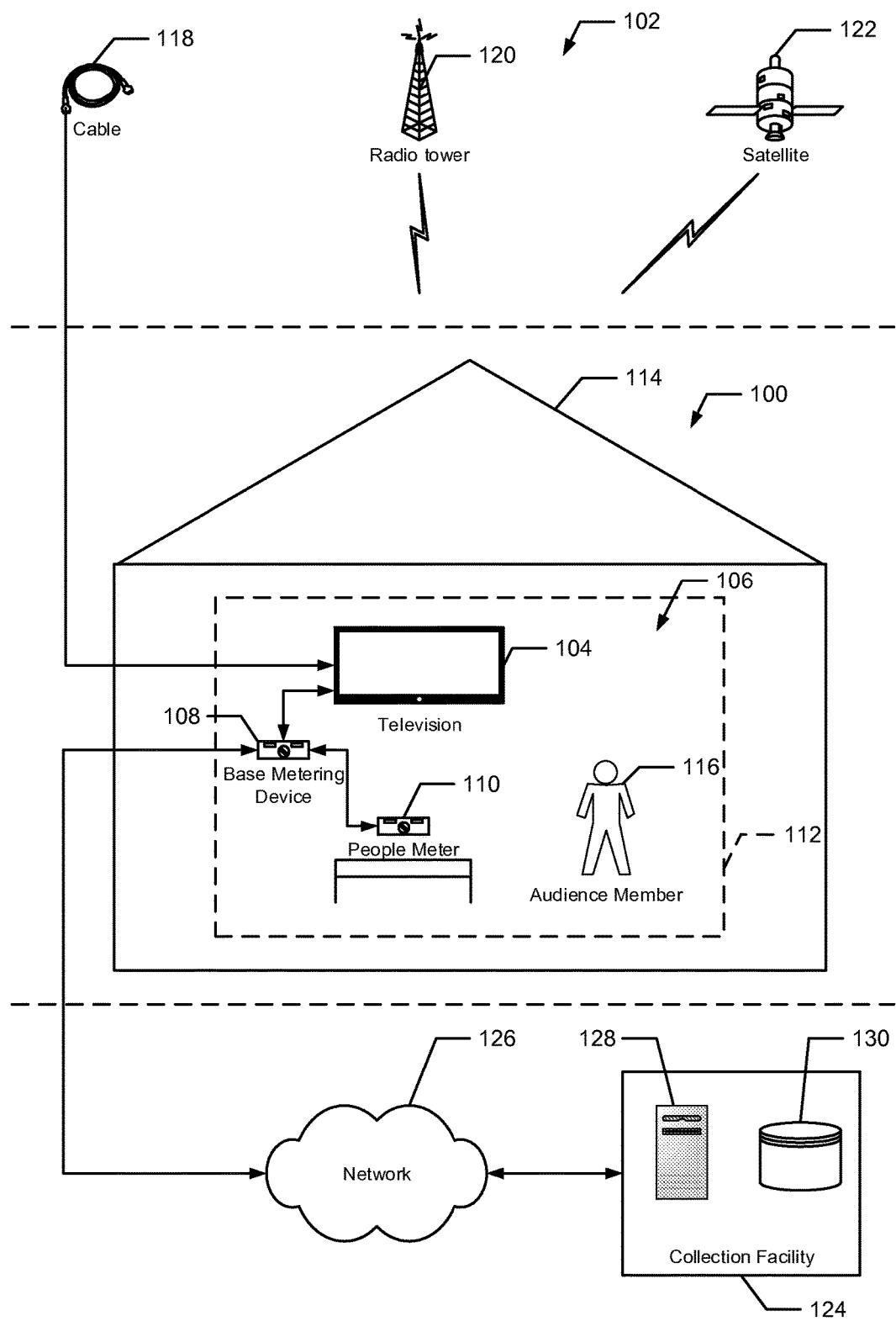
FIG. 1 shows a diagram of a monitored household with a people meter.

Example methods, apparatus, systems, and articles of manufacture to collect audience measurement data are disclosed. A disclosed example method includes collecting first program identification data and audience identification data during a first time period. The audience identification data is collected by prompting audience members in the monitored household to self-identify using a people meter and developing audience member behavior data based on the first program identification data and the audience identification data collected during the first time period. The example method also includes collecting second program identification data in a second time period after the first time period without collecting audience identification data and identifying the audience members associated with the second program identification data based on the audience member behavior data.

A disclosed example system to collect audience measurement data includes a set of active audience metering systems. The active audience metering systems are located in respective households and include a respective base metering device to collect program identification data and a respective people meter to collect audience identification data. Further, the disclosed example system includes a set of legacy audience metering systems. Each of the legacy audience metering systems has formerly been associated with an active audience metering system. Additionally, each of the legacy audience metering systems is located in a respective household and includes a respective meter to collect program identification data.

The example system disclosed herein also includes a collection server to receive program identification data and audience identification data from the set of active audience metering systems and program identification data from the set of legacy audience metering systems. The collection server adjusts the program identification data from the set of legacy audience metering systems based on the program identification data and audience identification data from the set of active audience metering systems. Additionally or alternatively, the collection server may adjust the program identification data from the set of legacy audience metering systems based on program identification data and audience identification data from the legacy audience metering systems during the time period that those systems included people meters. The collection system uses this collected data to generate viewership statistics for advertisers, television program producers, and television content providers.

While the following disclosure is made with respect to example television systems, it should be understood that the disclosed system is readily applicable to many other media systems (e.g., radio, Internet, mobile devices, etc.). Accordingly, while the following describes example systems and methods, persons of ordinary skill in the art will readily appreciate that the disclosed examples are not the only way to implement such systems.

Currently, an audience measurement company enlists a plurality of television viewers (e.g., panelists or audience members) to cooperate in an audience measurement study for a predefined length of time. The audience measurement company monitors viewing habits of these enlisted viewers via a base metering device and a people meter. The base metering device and the people meter identify what activity occurs at the machine level (e.g., which television channel is being watched) and identify the presence of specific people viewing the television. The people meter is an electronic device that is typically disposed in a viewing area of a monitored household and is proximate to one or more of the viewers. The people meter communicates with the base metering device, which measures various signals associated with a television for a variety of purposes including, but not limited to, determining the operational status of the television, (i.e., whether the television is off or on) and identifying programming displayed by the television. The base metering device also collects and stores program identification data that is associated with viewed programming. Program identification data includes, for example, a title of a television program, a genre of a television program, names of actors in a television program, a channel broadcasting a television program, a time and/or day a television program is viewed, and/or any other type of information associated with a television program. The program identification data may be collected directly or, alternatively, via identifiers that are supplemented with reference data collected separately and combined though additional processing.

Additionally, many known audience measurement companies collect demographic data about enlisted viewers to statistically determine the size and demographics of a television viewing audience. The demographic data includes, for example, age, gender, income level, educational level, marital status, geographic location, race, etc. The demographic data is typically collected prior to an audience measurement company installing and/or activating a base metering device within a household to be monitored.

To correlate the collected program identification data with demographic data, audience measurement companies often utilize a people meter that periodically prompts viewers to self-identify. The people meter prompts audience members based on any number of triggers, including, for example a channel change or an elapsed period of time. Additionally, the people meter may prompt the audience members to input information by depressing one of a set of buttons, each of which is assigned to represent a different household member. Alternatively, audience members may self-identify by entering an identification code and/or their name into the people meter. For example, the people meter may prompt the audience members to register (i.e., log in) and/or prompt the audience members to indicate they are still present in the viewing audience. The people meter then forwards this audience identification data to the base metering device, which then combines the audience identification data with collected program identification data.

Typically, a household agrees to be monitored for a time period (e.g., two years). Although periodically inputting information in response to a prompt may not be burdensome when required for an hour, a day or even a week or two, some participants become weary of the prompting and data input tasks over longer periods of time (e.g., button pushing fatigue). Thus, after the monitoring time period has expired, many households choose to have the base metering device and people meter removed.

The example methods, apparatus, systems, and articles of manufacture described herein provide an incentive for households to remain monitored after the time period by removing the people meter, thereby eliminating ongoing prompts for audience members to self-identify. Three relatively significant cost drivers for operating audience measurement panels include identifying audience members, providing incentives for audience members to participate in the monitoring, and installing a people meter and/or a base metering device. By retaining households to monitor, an audience measurement company can save resources by not having to screen and/or select new households. Extended retention of households, particularly when relatively smaller incentives are required, enables an audience measuring company to more efficiently increase a sample size of monitored households. Additionally, by retaining households, an audience measurement company compiles longer time periods of data from the same household that may be used to identify how viewing habits of the same household change over time.

In addition, the example methods, apparatus, systems, and articles of manufacture described herein provide an audience measurement company flexibility for monitoring households after an initial time period. For example, after a time period of collecting audience measurement data and program identification data, the people meter and the base metering device is replaced with a mailable portable meter. Alternatively, after the time period, a service provider of the programming may send program identification data directly to the audience measurement company instead of the household having meters. In yet another example, data collected from the people meter and the base metering device may be used by the audience measurement company to monitor Internet usage and determine which audience members are using the Internet.

The example methods, apparatus, systems, and articles of manufacture described herein also provide an audience measurement company cost flexibility to monitor different regions. For example, broadcasters in a region may desire 500 households to be monitored but only have a relatively small budget. The example methods, apparatus, systems, and articles of manufacture described herein are utilized such that a first group of households is configured with a relatively more expensive active prompt people meter and base metering device, while a second group of households is configured with a relative less expensive passive base metering device. The example audience measurement company compiles data from the two groups and uses the active prompt data to determine which of the audience members from the passive group are most likely watching the monitored programming.

The example methods and apparatus, systems, and articles of manufacture described herein retrain monitored households by collecting first program identification data and audience identification data during a first time period. During this first time period, the audience identification data is collected by requiring audience members in the monitored household to self-identify using the people meter. The example methods, apparatus, and systems, and articles of manufacture described herein then generate audience member behavior data based on the first program identification data and the audience identification data collected in the first time period. After this first time period, the people meter is removed and second program identification data during a second time period is collected without collecting audience identification data. Because audience members no longer self-identify during the second time period, audience members associated with the second program identification data are identified based on the audience member behavior data complied during the first time period.

In the example of FIG. 1, a media system 100 including a media service provider 102, a television 104 is metered using an audience measurement system 106 having a base metering device 108 and a people meter 110. The television 104 is positioned in a viewing or media consumption area 112 located within a house 114 occupied by one or more people, referred to as audience members 116, all of whom have agreed to participate in an audience measurement research study. The viewing area 112 includes the area in which the television 104 is located and from which the television 104 is viewed by one or more audience members 116 located in the viewing area 112.

The media service provider 102 of the illustrated example is implemented using any media service provider 102 such as, but not limited to, a cable media service provider 118, a radio frequency (RF) media provider 120, and/or a satellite media service provider 122. The television 104 receives a plurality of signals transmitted via a plurality of channels by the media service provider 102 displays signals provided in any format such as, for example, an National Television Standards Committee (NTSC) television signal format, a high definition television (HDTV) signal format, an Advanced Television Systems Committee (ATSC) television signal format, a phase alternation line (PAL) television signal format, a digital video broadcasting (DVB) television signal format, an Association of Radio Industries and Businesses (ARIB) television signal format, etc. The processing performed by the television 104 includes, for example, extracting a video component delivered via the received signal and an audio component delivered via the received signal, causing the video component to be displayed on a screen/display associated with the television 104, and causing the audio component to be emitted by speakers associated with the television. The programming content contained in the media signal includes, for example, a television program, a movie, an advertisement, a video game, a radio program, and/or a preview of other programming that is or will be offered by the media service provider 102.

The example base metering device 108 of FIG. 1 is configured as a stationary device disposed on or near the television 104 and performs one or more of a variety of television metering methods. Depending on the types of metering that the base metering device 108 is to perform, the base metering device 108 can be physically coupled to the television 104 or may instead be configured to capture signals emitted externally by the television 104 such that direct physical coupling to the television 104 is not required. A base metering device 108 is provided for each television 104 or other monitored media device disposed in the household 114, such that the base metering devices 108 captures data regarding all in-home media viewing or consumption by the audience members 116. In an example, the base metering device 108 is implemented as a low-cost electronic device (e.g., a mailable meter) that is shipped to the viewer's home 114 (e.g., via regular mail) and installed by the audience member 116 by, for example, plugging the base metering device 108 into a commercial power supply, i.e., an electrical outlet.

The base metering device 108 of the illustrated example communicates with a remotely located central data collection facility 124 via a network 126. The network 126 is implemented using any type of public or private network such as, but not limited to, the Internet, a telephone network, a local area network (LAN), a cable network, and/or a wireless network. To enable communication via the network 126, the base metering device 108 includes a communication interface that enables a connection to an Ethernet, a digital subscriber line (DSL), a telephone line, a coaxial cable, or any wireless connection, etc. The example base metering device 108 sends program identification data and/or audience identification data to the central data collection facility 124 periodically and/or upon a request by the collection facility 124. The central data collection facility 124 includes a server 128 and a database 130. Further, the central data collection facility 124 processes and stores data received from the base metering device 108.

The example collection facility 124 of FIG. 1 combines audience identification data and program identification data from multiple households 114 to compile statistical viewing data. Additionally, the collection facility 124 integrates demographic data with the compiled viewing data to generate demographic statistical information. The example collection facility 124 receives the demographic information when the audience members 116 register and/or sign-up to be monitored. The collection facility 124 generates reports for advertisers and/or program producers based on the compiled statistical data.

In the example illustrated example of FIG. 1, the audience measurement system 106 includes the example people meter 110 disposed in the viewing area 112. The example people meter 110 includes a set of buttons (not shown). Each button may be assigned to represent a single, different one of the audience members 116 residing within the household 114. Alternatively, the buttons may enable the audience members 116 to enter corresponding identification data (e.g., a name). The people meter 110 periodically prompts the audience members 116, via a set of LEDs, a display screen, and/or an audible tone, to indicate that they are present in the viewing area 112 by pressing an assigned button. To decrease the number of prompts, and thus the number of intrusions imposed upon the television watching experience of the audience members 116, the base metering device 108 instructs the people meter 110 to prompt only when unidentified audience members 114 are located in the viewing area 112 and/or to prompt only after the base metering device 108 detects a channel change and/or a change in state of the television 104. In other examples, the base metering device 108 may include at least one sensor and/or be communicatively coupled to at least one sensor that detects a presence of the audience members 116 in the viewing area 112.

The example people meter 110 is implemented as a separate device that is communicatively coupled to the base metering device 108 or, alternatively, may be implemented as an integral part of the base metering device 108. In the example of FIG. 1, the audience members 116 agree for an audience measurement company to install the base metering device 108 and the people meter 110. Further, the audience members 116 agree to have the base metering device 108 and the people meter 110 collect program identification data and audience identification data for a time period. For example, the audience members 116 may agree to be monitored for two years. During these two years, the base metering device 108 stores program identification data associated with television programming viewed by the audience members 116. Additionally, the people meter 110 prompts the audience members 116 to self-identify. The people meter 110 transmits the identities of the audience members 116

(e.g., audience identification data) to the base metering device 108. The base metering device 108 then combines the program identification data and the audience identification data to create behavior data for each of the audience members 116. The behavior data is used by the base metering device 108 to correlate each of the audience members 116 to viewing trends or patterns over the two year time period. The example base metering device 108 periodically generates behavior data or, alternatively, generates behavior data after a predefined amount of program identification data has been collected.

Figure 2:
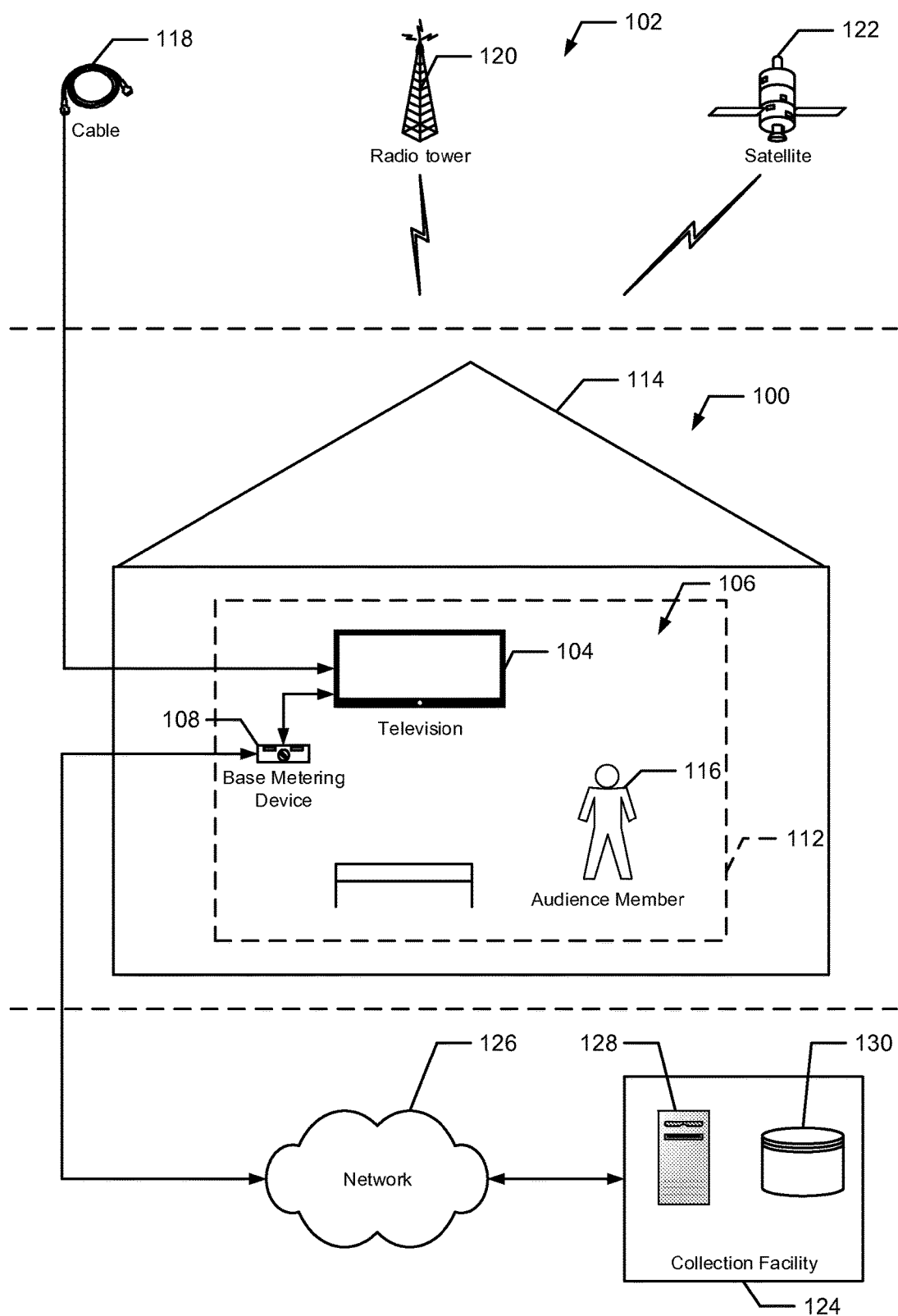
FIG. 2 shows a diagram of the monitored household of FIG. 1 without a people meter.

FIG. 2 shows a diagram of the monitored audience members 116 without the example people meter 110 of FIG. 1. In other examples, the people meter 110 is deactivated, thereby eliminating prompts to the audience members 116 to self-identify. The people meter 110 is removed and/or deactivated after an expiration of a first time period. After this first time period, the audience members 116 agree to be monitored by the base metering device 108 without having to self-identify via the people meter 110. In some examples, the audience members 116 are more willing to continue to be monitored when the people meter 110 is removed. In these examples, the audience members 110 become weary of periodically self-identifying. Because the base metering device 108 passively monitors the television 104 (e.g., without requiring interaction with the audience members 116), the audience members 116 may agree to retain the base metering device 108 for a second time period. In other words, the utilization of the behavior data by the base metering device 108 extends a panelist term of the audience members 116 by eliminating people meter 110 button pushing fatigue.

During this second time period, the base metering device 108 collects program identification data associated with programs viewed by the audience members 116. However, because the audience members 116 are not self-identifying, the example base metering device 108 uses the behavior data compiled during the first time period to determine the identities of the audience members 116 viewing the programming. The example base metering device 108 determines which of the audience members 116 are viewing programming by matching program identification data to the compiled behavior data for each of the audience members 116. For example, the base metering device 108 identifies program identification data of a currently viewed program. This program identification data includes a day (e.g., Thursday), a time (e.g., 9:00 P.M.), a title, (e.g., The Office), a genre (e.g., comedy), and/or a broadcast channel (e.g., NBC). The base metering device 108 partitions the audience identification data into categories and matches the data to corresponding data in the same category within the behavior data. Thus, if the behavior data of the audience member 116 includes at least some matches (e.g., The Office, Thursday, 9:00 P.M., comedy, NBC), the base metering device 108 infers that the audience member 116 is currently viewing the programming. The base metering device 108 then stores audience identification data associated with the determined or identified audience member(s) with the program identification data of the currently viewed program.

In other examples, the base metering device 108 of FIG. 2 utilizes statistics to determine which of the audience members 116 are viewing the programming. A statistical analysis may include, for example, a Naïve Bayes analysis, a regression analysis, a fuzzy logic algorithm, an analysis of variance test, and/or any other statistical algorithm. In a Naïve Bayes analysis, for example, the base metering device 108 utilizes the behavior data collected during the first time period with the people meter 110 as a training set used to calculate a probability that each of the audience members 116 is currently viewing programming.

Alternatively, the examples in FIG. 1 and FIG. 2 may represent two different households during a time period. For example, FIG. 1 shows the audience measurement system 106 as an active metering system including the people peter 110 and the base metering device 108. The audience measurement system 106 of FIG. 1 collects audience measurement data via the people meter 110 and program identification data via the base metering device 108.

Additionally, FIG. 2 shows the audience measurement system 106 as a legacy audience metering system including the base metering device 108. The audience measurement system 106 of FIG. 2 collects program identification data via the base metering device 108. Further, the audience measurement system 106 of FIG. 2 has collected audience identification data via the people meter 110 during a previous time period.

The example collection facility 124 of FIGS. 1 and 2 collects the audience identification data from the house 114 of FIG. 1 and the respective program identification data from the house 114 of FIGS. 1 and 2. The example collection facility 124 uses the audience identification data and the program identification data from the house 114 of FIG. 1 to determine which of the audience members 116 of FIG. 2 viewed programming associated with the programming identification data. The collection facility 124 determines the audience members 116 of FIG. 2 by matching, adjusting, and/or correlating demographic information to the audience members 116 of FIG. 1.

Alternatively, the collection facility 124 may use audience identification data and program identification data collected during the previous time period from the house 114 of FIG. 2 to determine which of the audience members 116 watched which programming during the current time period. In yet another example, the collection facility 124 may use the audience identification data and the program identification data collected during the previous time period from the house 114 of FIG. 2 and the audience identification data and the program identification data from the house 114 of FIG. 1 to determine which of the audience members 116 watched which programming during the current time period.

Figure 3:
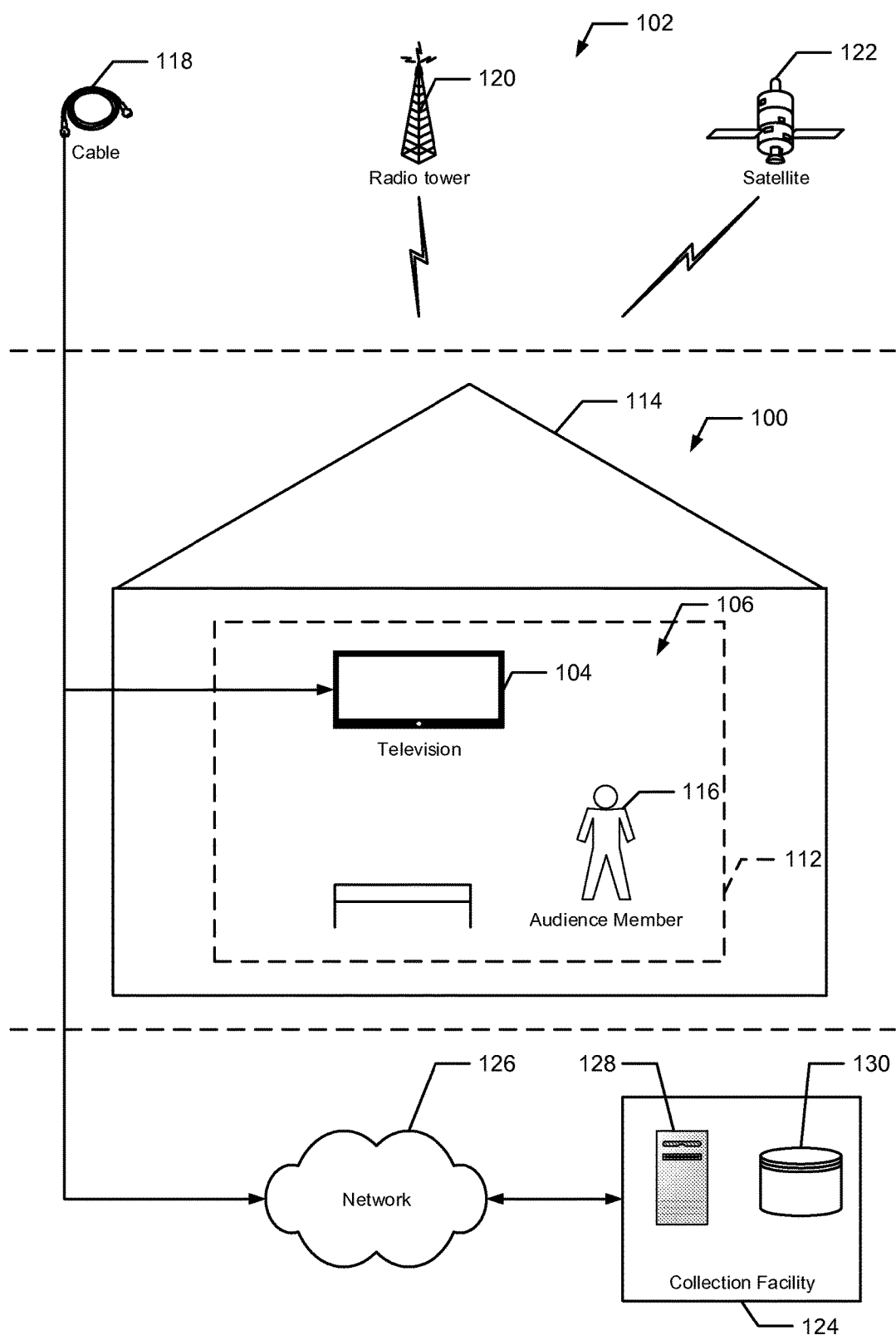
FIG. 3 shows a diagram of the monitored audience members of FIGS. 1 and/or 2 without a base metering device.

FIG. 3 shows a diagram of the monitored audience members 116 without the example base metering device 108 of FIGS. 1 and/or 2. In this example, the audience members 116 agree to have program identification data sent directly from the cable media service provider 118. In other examples, the program identification data is sent from the RF media provider 120 and/or the satellite media service provider 122 to the collection facility 124.

The audience members 116 agree to have the base metering device 108 removed and/or deactivated with the people meter 110 after the time period of self-identifying. However, the audience members 116 agree to have program identification data sent to the collection facility 124 without having measurement components within the house 114. In this manner, the audience members 116 are still monitored by the collection facility 124 of the audience measurement company without having measurement components (e.g., the base metering device 108 and the people meter 110) within the audience measurement system 106. The example collection facility 124 correlates the program identification data from the service provider 118 with the already collected program identification data and the audience identification data to determine which of the audience members 116 viewed the programming.

In other examples, the base metering device 108 is replaced with a passive mailable meter that collects program identification data. In these examples, the audience members 116 setup the mailable meter in proximity to the television 104 to record program identification data. In yet other examples, the base metering device 108 is replaced with portable meters that are worn and/or carried by the audience members 116. In these examples, the portable meters collect program identification data when the audience member 116 is within the viewing area 112.

Figure 4:
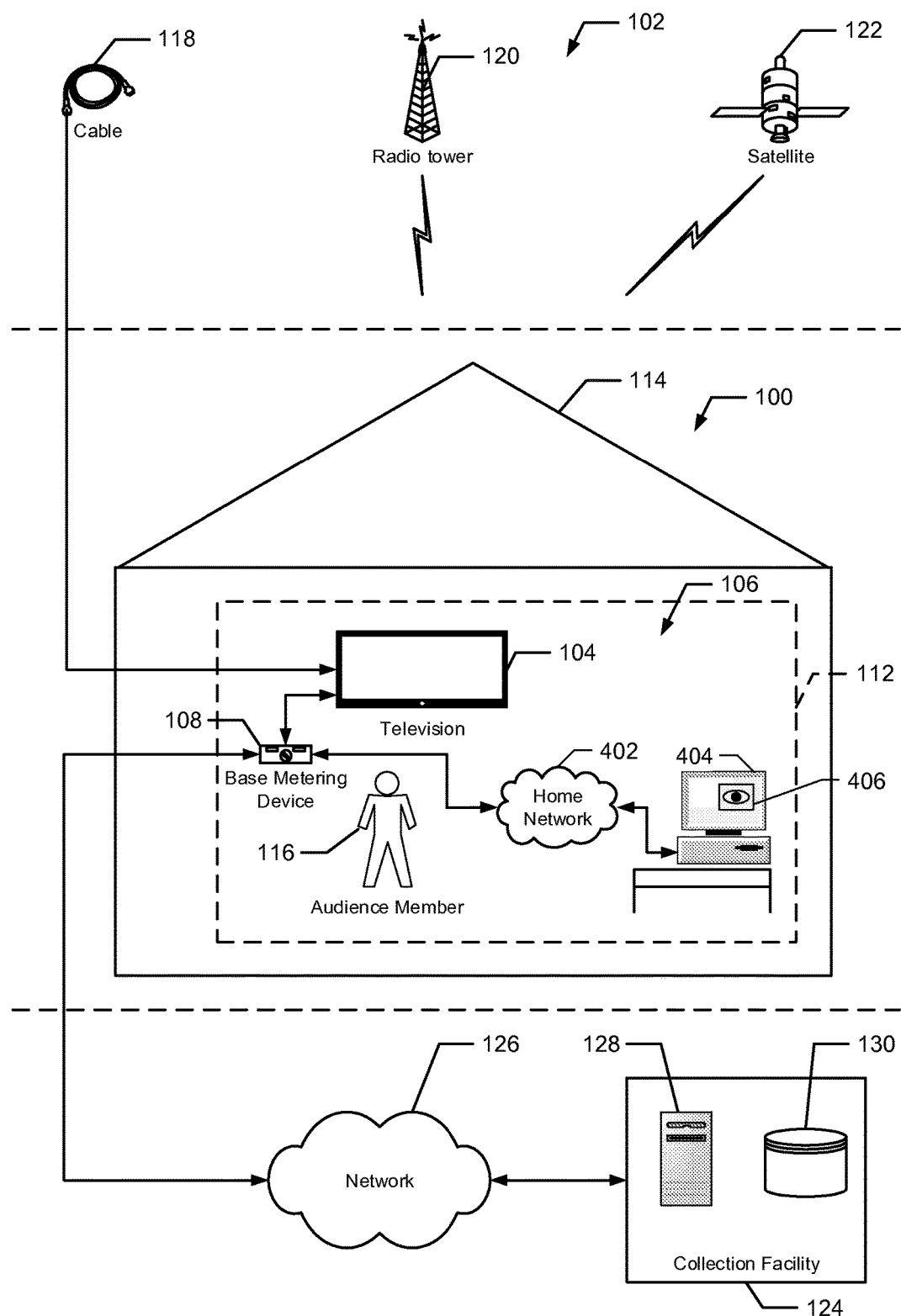
FIG. 4 shows a diagram of the monitored audience members with a home network and a computer.

FIG. 4 shows a diagram of the monitored audience members 116 including a home network 402 and a computer 404. In this example, the people meter 110 is removed after the first time period, similar to the example shown in FIG. 2. Additionally, after the first time period, the audience members 116 agree to have their Internet usage monitored. To monitor Internet usage, an audience measurement company installs a software monitoring application 406 on the computer 404. In other examples, the collection facility 124 transmits the monitoring application 406 to the computer 404. In yet other examples, the audience member 116 installs the monitoring application 406 on the computer 404. In yet other examples, the base metering device 108 monitors the Internet usage of the audience members 116.

The example computer 404 in FIG. 4 is shown communicatively coupled to the base metering device 108 via the home network 402. In other examples, the computer 404 may be coupled to the network 126 via the home network 402 and/or via a network gateway (not shown). Alternatively, the computer 404 may be replaced by a cell phone, a smartphone, a laptop, or a netpad, and/or any other device capable of connecting to the Internet. The example home network 402 of the illustrated example includes a Local Area Network (LAN), wireless LAN (WLAN), Virtual Private Network (VPN), and/or any other network.

An audience measurement company collects and/or combines Internet usage data with television viewing data to generate statistical reports based on different media types. In the example of FIG. 4, the monitoring application 406 on the computer 404 and/or the base metering device 108 monitors Internet usage of the audience members 116. Because the audience members 116 are generally weary of self-identifying while viewing Internet content, the base metering device 108 uses behavior data collected during the first time period to determine which of the audience members 116 is using the computer 404. In other examples, the monitoring application 406 utilizes the behavior data stored on the base metering device 108 and/or stored at the collection facility 124.

The audience members 116 are identified by matching Internet usage behavior to the behavior data associated with, for example, television programming viewing. Because the behavior data (e.g., audience identification data combined with program identification data) of the audience members 116 is collected over a relatively long time period, the monitoring application 406 and/or the base metering device 108 matches Internet usage to patterns within the behavior data. For example, the audience member 116 that navigates to ESPN.com is matched by the monitoring application 406 and/or the base metering device 108 to television behavior data that includes the channel ESPN and/or more generally, a sports genre. Similarly, the audience member 116 that posts messages on a Facebook Internet application regarding home improvements may be matched by the monitoring application 406 and/or the base metering device 108 to behavior data that includes home improvement television programs and/or channels (e.g., HGTV). Thus, the monitoring application 406 and/or the base metering device 108 collects Internet usage data, determines which of the audience members 116 navigated to an Internet site corresponding to the usage data, and transmits the collected data to the collection facility 124.

The collection facility 124 combines the Internet usage data and program identification data collected during a second time period subsequent to the first time period and adjusts and/or combines this data with program identification data and audience identification data collected during the first time period. Further, the Internet usage data is combined with the television data to generate behavior data for each of the audience members 116 that is used for statistical analysis and/or marketing reports.

Figures 5, 6:
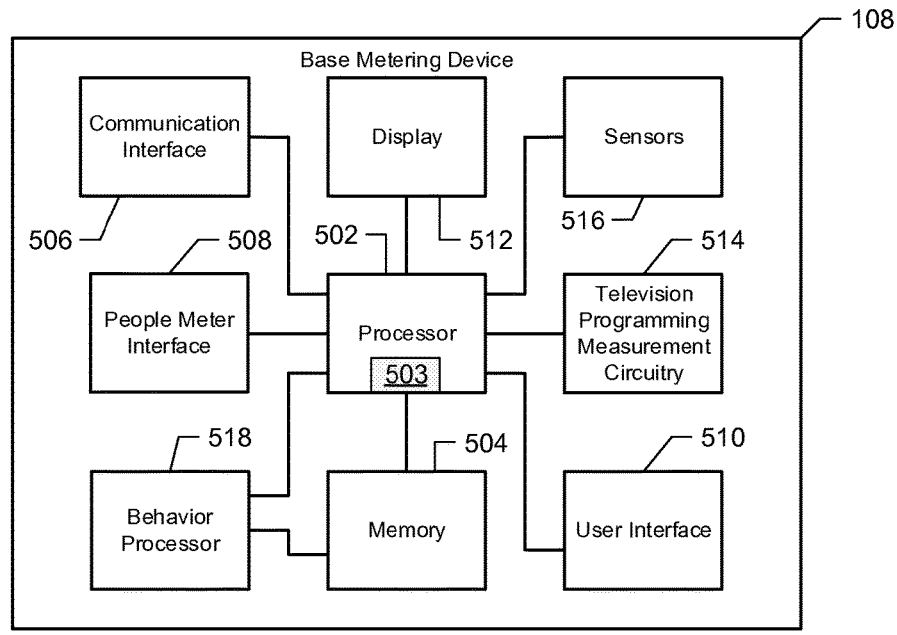
FIG. 5 shows an example functional diagram of the example base metering device used to collect program identification data viewed by the monitored households of FIGS. 1, 2, and 4.
FIG. 6 shows a table of example audience identification data and program identification data collected by the example based metering device of FIG. 5.

FIG. 5 shows an example functional diagram of the example base metering device 108 used to collect program identification data viewed by the audience members 116 of FIGS. 1, 2, and 4. The example base metering device 108 includes a processor 502 to control the operation of the base metering device 108 in a manner that enables the functionality described herein. For example, the processor 502 collects and stores program identification data based on storage criteria (e.g., time period, day, session, audience member, etc.). Additionally, the processor 502 communicates with the collection facility 124, the people meter 110, and/or the computer 404.

To determine when the first time period expires, the example processor 502 includes a timer 503. The example timer 503 indicates to the processor 502 when the first time period ends and/or when the second time period ends. Upon receiving a notification of an expiration of the first time period from the timer 503, the example processor 502 stops receiving audience identification data from the people meter 110. In other examples, the base metering device 108 may sense when the people meter 110 is deactivated and/or removed and resets the timer 503 to start a second time period. Additionally, upon an expiration of a time period on the timer 503, the processor 502 transmits behavior data, audience identification data, program identification data, demographic data, and/or Internet usage data to the to the collection facility 124.

To store instructions utilized by the example processor 502 and/or to store audience identification data, program identification data, behavior data, demographic data, and/or Internet usage data, the base metering device 108 includes a memory 504. The example memory 504 may be implemented as a programmable gate array, an application specific integrated circuit (ASIC), an erasable programmable read only memory (EPROM), a read only memory (ROM), a random access memory (RAM), a magnetic media, an optical media and/or any other suitable type of medium.

The base metering device 108 of the illustrated example also includes a communication interface 506 that enables communication between the base metering device 108 and the remotely located central data collection facility 124 via the network 126. For example, the communication interface 506 is implemented using any, communication interface capable of enabling communication with the central data collection facility 124 via the network 126 including for example, an Ethernet card, a digital subscriber line, a coaxial cable, or any wireless connection. The communication interface 506 also enables communication with the monitoring application 406 on the computer 404 via the home network 402.

The example communication interface 506 of FIG. 5 periodically transmits audience identification data, program identification data, behavior data, and/or demographic data stored within the memory 504 to the collection facility 124 via the network 126. Alternatively, the communication interface 506 may receive a request from the collection facility 124 to transmit the collected data. The example communication interface 506 of the illustrated example also transmits status and/or diagnostic information associated with the operation of the base metering device 108 to the collection facility 124.

To enable the transfer of audience identification data from the people meter 110, the example base metering device 108 of FIG. 5 includes a people meter interface 508. The example people meter interface 508 receives audience identification data from the people meter 110 and forwards the data to the processor 502. Additionally, the people meter interface 508 sends an instruction to the people meter 110 to prompt the audience members 116 to self-identify.

The example base metering device 108 also includes a user interface 510 that enables the audience members 116 to provide information directly to the base metering device 108. This information includes registration data to configure the base metering device 108 within the audience measurement system 106 and/or demographic data for each of the audience members 116. In some examples, the user interface 510 includes, for example, a keyboard, touchpad, and/or keypad. Upon receiving information from the audience members 116, the user interface 510 transmits the information to the processor 502.

The user interface 510 displays this received information to the audience members 510 via a display 512. The display 512 receives data and/or information from the processor 502. In some examples, the display 512 provides registration instructions and/or prompts audience members 116 to provide demographic information. Additionally, if the processor 502 detects an error associated with the audience measurement system 106, the processor 502 provides troubleshooting instructions via the display 512.

To collect program identification data, the example base metering device 108 of FIG. 5 includes television programming measurement circuitry 514. The example television programming measurement circuitry 514 includes any hardware, meters, and/or software for detecting programming identification data from the service providers 118-122 displayed by the television 104. In some examples, the television programming measurement circuitry 514 receives program identification data from the service providers 118-122. In other examples, the television programming measurement circuitry 514 identifies program identification data from embedded and/or encoded signals within the programming. In yet other examples, the television programming measurement circuitry 514 determines program identification data from audio and/or video input to and/or output from the television 104.

The example television programming measurement circuitry 514 of the illustrated example transmits the determined program identification data to the processor 502. The example processor 502 then combines the program identification data with audience identification data received from the people meter interface 508 and stores the data within the memory 504. In this manner, the processor 502 links viewed programming with the audience members 116 that viewed the programming.

The example base metering device 108 of FIG. 5 also includes one or more sensors 516 to detect the audience members 116 within the viewing area 112. The sensors 516 include, for example, motion sensors, heat sensors, infrared object detection sensors, etc. The example processor 502 uses the number of individuals detected by the sensors 516 to ensure each of the detected audience members 116 self-identifies via the people meter 110. Additionally, the example processor 502 uses a number of the detected audience members 116 from the sensors 516 to determine how many of the audience members 116 are within the viewing area 112 during the second time period when the people meter 110 is removed and/or deactivated. For example, if the sensors 516 detect two people, the processor 502 determines which of the two audience members 116 are in the viewing area 112 based on behavior data collected during the first time period with the people meter 110.

To process audience identification data and/or program identification data, the example base metering device 108 of FIG. 5 includes a behavior processor 518. The example behavior processor 518 generates behavior data based on the audience members 116 self-identifying while viewing programming during a first time period. During the first time period, the behavior processor 518 receives program identification data and corresponding audience identification data from the processor 502. The behavior processor 518 accesses the memory 504 for compiled behavior data for each of the audience member 116 and stores the received data to the appropriate partition within the memory 504 associated with the audience member(s) 116. Additionally, the example behavior processor 518 periodically compiles and/or summarizes the behavior data for each of the audience members 116 based on viewing trends and/or patterns.

During a second time period when the people meter 110 is removed and/or deactivated, the example behavior processor 518 receives program identification data from the processor 502 and determines which of the audience members 116 viewed the corresponding programming based on the behavior data. For example, the behavior processor 518 matches a day, a time, a program title, a program genre, and/or a broadcast channel to corresponding behavior data. The behavior processor 518 then determines that the audience member(s) 116 with a number of matching categories above a threshold are currently viewing the programming. In other examples, the behavior processor 518 implements a statistical algorithm (e.g., fuzzy logic, Naïve Bayes, regression analysis, etc.) to determine which of the audience member(s) 116 are most likely viewing current programming based on patterns within the behavior data. The behavior processor 518 then links the determined audience members 116 with the received program identification data and stores this information to the memory 504.

The example behavior processor 518 of the illustrated example also determines during a second time period which of the audience members 116 are navigating the Internet based on Internet usage data received from the communication interface 506. For example, the monitoring application 406 on the computer 404 of FIG. 4 transmits Internet usage data to the base metering device 108. The communication interface 506 transmits the Internet usage data to the behavior processor 518 via the processor 502. The behavior processor 518 then matches Internet usage data to patterns within the behavior data for each of the audience members 116. In some examples, the behavior processor 518 may analyze and/or compare trends in the navigation history of the Internet usage data to viewing patterns of the behavior data. Alternatively, the behavior processor 518 may match portions of the Internet usage data to corresponding categories of the behavior data. Further, during the first time period, the behavior processor 518 generates behavior data based partially on Internet usage data and Internet audience identification data in instances when the monitoring application 406 prompts the audience members 116 to self-identify using the computer 404.

While an example manner of implementing the base metering device 108 of FIGS. 1-4 has been illustrated in FIG. 5, one or more of the elements, processes and/or devices illustrated in FIG. 5 may be combined, divided, re-arranged, omitted, eliminated and/or implemented in any other way. Further, the example processor 502, the example memory 504, the example communication interface 506, the example people meter interface 508, the example user interface 510, the example display 512, the example television programming measurement circuitry 514, the example sensors 516, the example behavior processor 518 and/or, more generally, the example base metering device 108 of FIG. 5 may be implemented by hardware, software, firmware and/or any combination of hardware, software and/or firmware. Thus, for example, any of the example processor 502, the example memory 504, the example communication interface 506, the example people meter interface 508, the example user interface 510, the example display 512, the example television programming measurement circuitry 514, the example sensors 516, the example behavior processor 518 and/or, more generally, the example base metering device 108 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example processor 502, the example memory 504, the example communication interface 506, the example people meter interface 508, the example user interface 510, the example display 512, the example television programming measurement circuitry 514, the example sensors 516, and/or the example behavior processor 518 are hereby expressly defined to include a computer readable medium such as a memory, DVD, CD, etc. storing the software and/or firmware. Further still, the example base metering device 108 of FIG. 5 may include one or more elements, processes and/or devices in addition to, or instead of, those illustrated in FIG. 5, and/or may include more than one of any or all of the illustrated elements, processes and devices.

FIG. 6 shows a table 600 of example audience identification data and program identification data collected by the example based metering device 108 of FIGS. 1, 2, 4, and/or 5. The example base metering device 108 collects this data in the table 600 during the first time period when the people meter 110 prompts the audience members 116 to self-identify. In the example of FIG. 6, the table 600 includes data for a session (e.g., Tuesday Feb. 16, 2010). The column of the table 600 labeled Self-Identified Audience Members includes audience identification data. The columns labeled Time Period, Title, Genre and Channel include program identification data. In other examples, the base metering device 110 may collect other types of program identification data including, but limited to, actors of the program, a director of the program, a live/taped status of the program, a repeat/first run status of the program, advertisements shown during breaks in the program, etc.

In an example of FIG. 6, during the 8:00-9:00 P.M. time period, the base metering device 108 collects program identification data associated with the program Law and Order-LVU that is shown by the television 104. Also during this 8:00-9:00 time period, the example people meter 110 prompts for any of the audience members 116 to self-identify. In this example, the audience member associated with the BF01 identifier uses the people meter 110 to self-identify. The base metering device 108 continues to collect program identification data and combine this data with audience identification data transmitted from the people meter 110 for the other times (e.g., 9:00-9:30 P.M., 9:30-10:00 P.M., 10:00-11:00 P.M., and 11:00-11:20 P.M.).

FIG. 7 shows a table 700 of behavior data compiled by the example base metering device 108 of FIGS. 1, 2, 4, and/or 5 during the first time period. The first time period shown in the table 700 is from Jan. 15, 2009 through Jan. 15, 2011. During this time period, the example base metering device 108 collects and compiles audience identification data and program identification data as shown in conjunction with the table 600 in FIG. 6. Periodically during this time period and/or after this first time period, the base metering device 108 generates the behavior data shown in the table 700 based on data within tables similar to the table 600.

In the example of FIG. 7, the table 700 includes the audience member identifiers BF01, DF01, and SF01 that correspond to the audience members 116. The example table 700 also includes a summary of times, days, program titles, genres, and channels frequently viewed by each of the audience members 116. Additionally, the Titles, Genres and Channels columns of the table 700 are not necessarily aligned with the Times and Days columns. For example, the table 700 shows that the BF01 audience member watched the most television programming from 8:00-9:00 P.M. on Mondays, Tuesdays and Wednesdays and watched the second most television programming from 10:00-11:00 P.M. on Tuesdays and Thursdays. Additionally, the television program Law & Order—SVU was the most watched television program and the NBA was the fifth most watched television program by the BF01 audience member. However, Law & Order SVU was not necessarily watched from 8:00-9:00 P.M. on Mondays, Tuesdays, and Wednesdays. Similarly, the example table 700 includes behavior data for the audience members DF01 and SF01.

In other examples, the table 700 may include other categories of program identification data (e.g., actor names, show status information etc.). Further, in examples where the behavior processor 518 of FIG. 5 utilizes statistical algorithms, the example table 700 may include weights and/or values associated with the behavior data. For example, the shows listed under the Title category can be assigned a weight based on a frequency rank of the show within the category. For example, Law and Order—SVU receives a higher rank if the show was viewed more frequently than Iron Chef America. In other examples, the table 700 may also include categories that correspond to Internet usage data (e.g., webpage name, webpage genre, keywords, etc.) and/or demographic data.

The table 700 of FIG. 7 is used by the example behavior processor 518 to determine which of the audience members 116 is watching television programming. For example, during the second time period when the people meter 110 is removed and/or deactivated, the base metering device 108 determines program identification data viewed on a Tuesday at 9:35 P.M. with a title of Lost. The example behavior processor 518 first matches the day and time of the shown to all three of the audience members BF01, DF01, and SF01. The behavior processor 518 then determines that only the audience members DF01 and SF01 match the program titles of Lost. As a result, the behavior processor 518 determines that DF01 and SF01 are likely currently watching the television program Lost.

In other examples, the behavior processor 518 analyzes the table 700 for viewing patterns to determine which of the audience members 116 are watching programming during the second time period when there is not an exact match to the behavior data. For example, the behavior processor 518 may determine that the audience member BF01 is viewing a college hockey game based on the viewing patterns in the table 700 that indicate BF01 frequently watches sports including college basketball and the NBA.

In these other examples, the behavior processor 518 may accumulate values and/or weights for each matching item for the categories in the table 700 for each of the audience members 116. The behavior processor 518 then determines which of the audience members 116 are most likely watching programming if the accumulated value for each audience member 116 is greater than a predefined threshold. For example, if the behavior processor 518 determines that program identification data for a currently viewed program includes a program time of 8:00 P.M., a day of Monday, a title of Fishing in Colorado, a genre of outdoor sports, and a channel of ESPN, the behavior processor 518 matches the program identification data to the items within the table 700. The behavior processor 518 may calculate the probability that the BF01 audience member is watching television by adding a weight from matching the 8:00-9:00 P.M. time on a Monday, a weight from matching the genre of sports, and a weight from matching the ESPN channel. The behavior processor 518 may calculate the probability that the DF01 audience member is watching television by noting no items within the categories listed in table 700 match the audience identification data indicating a probability of zero. The behavior processor 518 may also calculate the probability that the SF01 audience member is watching television by adding a weight from matching the 8:00-9:00 P.M. time on a Monday. The behavior processor 518 may then determine that only the calculated probability for the BF01 audience member is greater than a threshold to indicate that the BF01 audience member is currently viewing the television programming.

The behavior processor 518 of the illustrated example also uses the behavior data shown in the table 700 to identify which of the audience members 116 is using the computer 404 (and/or any other device capable of providing media content) to browse content on the Internet. For example, the behavior processor 518 may determine that SF01 is browsing the Onion.com Internet site based on matching behavior data patterns to the genre of Comedy and the program title of Family Guy. In yet other examples where the collection facility 124 of FIGS. 1-4 receives program identification data directly from the service providers 118-122, the collection facility 124 may use the behavior data within the table 700 to identify which of the audience members 116 is watching television. Further, a portable and/or mailable meter that records program identification data may also access and/or utilize the example table 700 to determine which of the audience members 116 is watching television.

Flowcharts representative of example machine readable instructions for implementing the base metering device 108 of FIGS. 1-5 are shown in FIGS. 8A, 8B, 9A, 9B, and 10. The machine readable instructions may comprise a program for execution by a processor such as the processor P105 shown in the example processor platform P100 discussed below in connection with FIG. 11. The program may be embodied in software stored on a computer readable medium such as a CD-ROM, a floppy disk, a hard drive, a digital versatile disk (DVD), or a memory associated with the processor P105, but the entire program and/or parts thereof could alternatively be executed by a device other than the processor P105 and/or embodied in firmware or dedicated hardware. Further, although the example program is described with reference to the flowcharts illustrated in FIGS. 8A, 8B, 9A, 9B, and 10, many other methods of implementing the example base metering device 108 may alternatively be used. For example, the order of execution of the blocks may be changed, and/or some of the blocks described may be changed, eliminated, or combined.

As mentioned above, the example instructions of FIGS. 8A, 8B, 9A, 9B, and 10 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example instructions of FIGS. 8A, 8B, 9A, 9B, and 10 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Figure 8A:
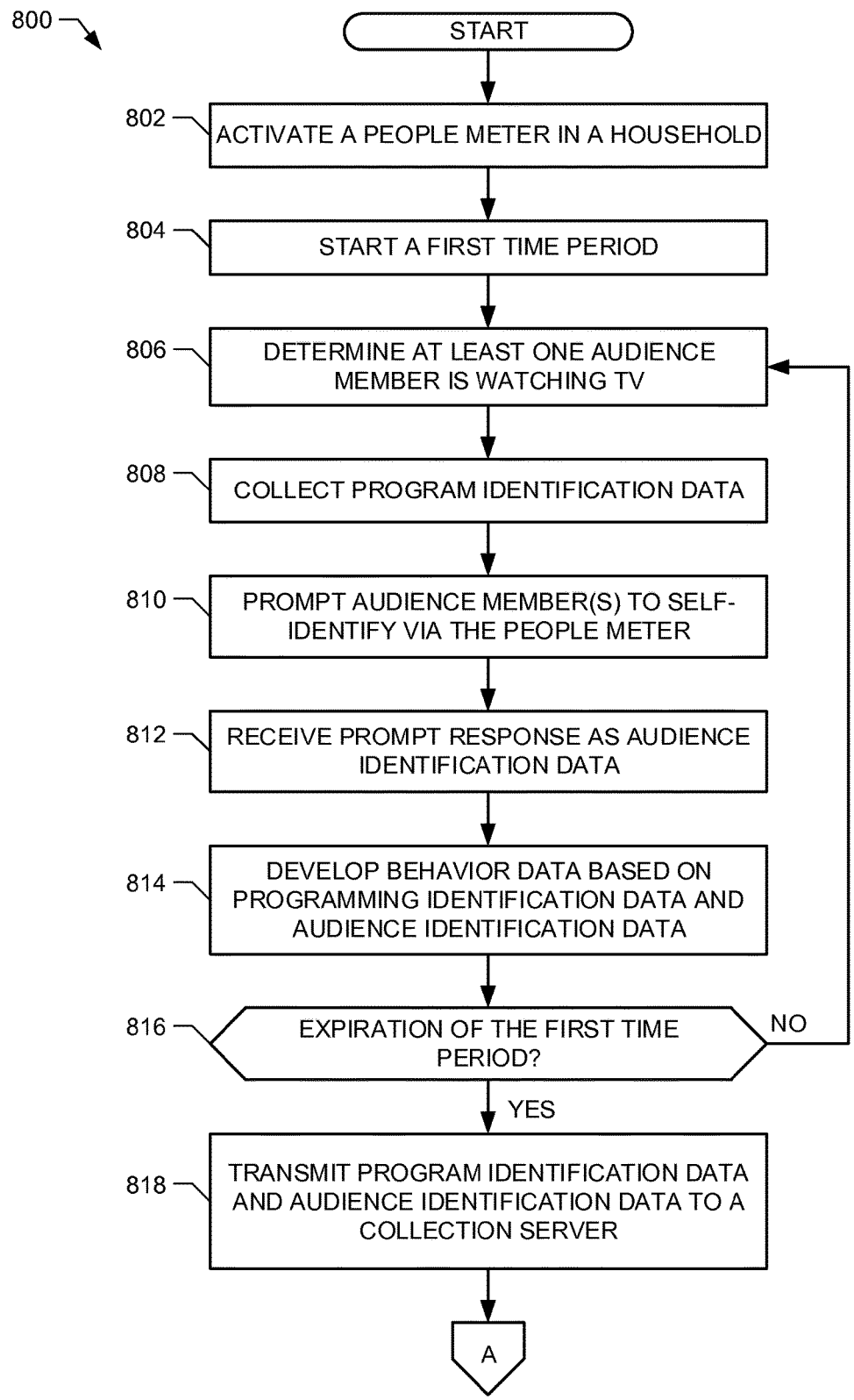
FIGS. 8A, 8B, 9A, 9B, and 10 are flowcharts of example machine-accessible instructions, which may be executed to implement the people meter or the example base metering device of FIGS. 1-5.
Figure 8B:
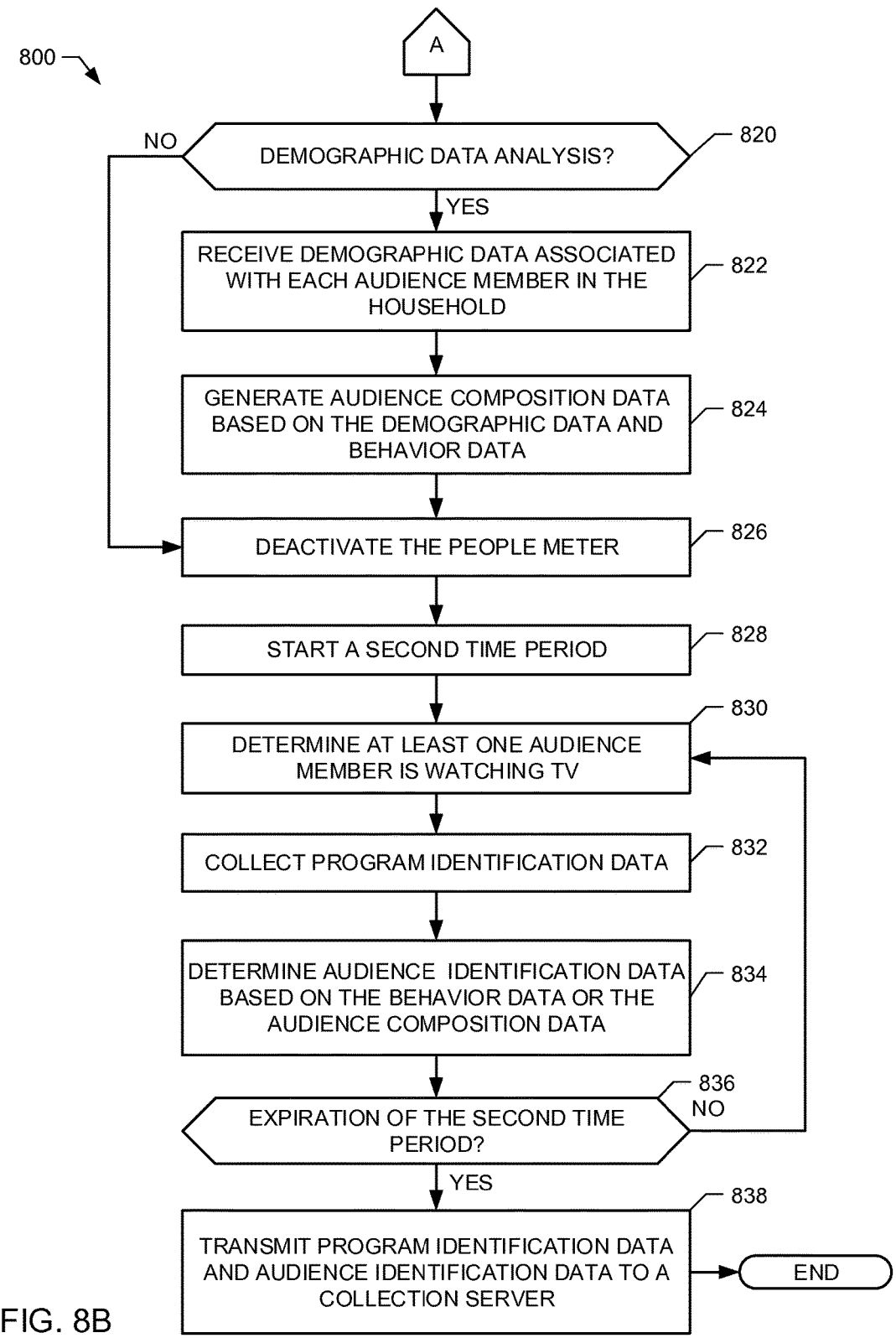

Example instructions 800 of FIGS. 8A and 8B collect behavior data during a first time period using a people meter 110 and determine which audience members are viewing programming based on the behavior data during a second time period when the people meter 110 is removed. Multiple instances of the example instructions 800 may be executed in parallel or series for different households. Additionally, multiple instances of the example instructions 800 may be executed in parallel or series for different base metering devices 108 within the same household.

The example instructions 800 of FIG. 8A begin by activating the people meter 110 within the viewing area 112 of a house 114 (block 802). The example instructions 800 start a first time period for collecting audience identification data and/or program identification data (e.g., via the base metering device 108) (block 804). Next, the example instructions 800 determine that at least one of the audience members 116 is watching the television 104 (e.g., via the television programming measurement circuitry 514) (block 806). The example instructions 800 determine that at least one of the audience members is watching programming by a television on/off detection algorithm and/or sensors (e.g., the sensors 516).

The example instructions 800 then collect program identification data associated with the viewed programming (e.g., via the television programming measurement circuitry 514) (block 808). While the program is being viewed, the example instructions 800 prompt the audience members 116 to self-identify (e.g., via the people meter 110) (block 810). The example instructions 800 receive the prompt response as audience identification data from the audience members 116 self-identifying via the people meter 110 (e.g., via the people meter interface 508) (block 812). Next, the example instructions 800 combine the audience identification data and the program identification data similar to the data shown in the table 600 of FIG. 6 for the current viewing session (e.g., via the behavior processor 518) (block 814). The example instructions 800 also develop and/or generate behavior data from the combined data similar to the data shown in the table 700 of FIG. 7 (e.g., via the behavior processor 518) (block 814).

The example instructions 800 continue by determining if the first time period has expired (e.g., via the timer 503) (block 816). If the first time period has not expired, the example instructions 800 return to determining if at least one audience member is watching programming (block 806). However, if the first time period has expired, the example instructions 800 transmit the collected program identification data, audience identification data, behavior data, and/or demographic data to the collection facility 124 (e.g., via the processor 502 and/or the communication interface 506) (block 818). Alternatively, the example instructions 800 may periodically transmit this data to the collection facility 124.

The example instructions 800 of FIG. 8B then determine if a demographic data analysis is to be performed on the collected behavior data (e.g., via the behavior processor 518) (block 820). If a demographic data analysis is to be performed, the example instructions 800 prompt the audience members 116 for and subsequently receive demographic data (e.g., via the user interface 510) (block 822). The example instructions 800 then combine the demographic data for each of the audience members 116 with corresponding behavior data to generate audience composition data (e.g., via the behavior processor 518) (block 824). The example instructions 800 use patterns within the audience composition data to determine which of the audience members 116 is viewing programming when the people meter 110 is removed. In other examples, the demographic data may be collected upon the start of the first time period.

Upon generating the audience composition data (block 824) and/or upon determining a demographic data analysis is not to be performed (block 820), the example instructions 800 deactivate and/or remove the people meter 110 (e.g., via the people meter interface 508) (block 826). The example instructions 800 then start a second time period (e.g., via the timer 503) (block 828). During this second time period, the example instructions 800 collect program identification data without prompting the audience members to self-identify.

The example instructions 800 of FIG. 8B continue by determining that at least one of the audience members 116 is watching the television 104 (e.g., via the television programming measurement circuitry 514) (block 830). Next, the example instructions 800 collect program identification data associated with the viewed programming (e.g., via the television programming measurement circuitry 514) (block 832). The example instructions 800 determine which of the audience members 116 is watching the programming (e.g., generate audience identification data) based on the behavior data and/or the audience composition data collected during the first time period (e.g., via the behavior processor 518) (block 834).

The example instructions 800 then determine if the second time period has expired (e.g., via the timer 503) (block 836). If the second time period has not expired, the example instructions 800 return to determining if at least one audience member is watching programming (block 830). However, if the second time period has expired, the example instructions 800 transmit the collected program identification data, audience identification data, behavior data, and/or demographic data to the collection facility 124 (e.g., via the processor 502 and/or the communication interface 506) (block 838). The example instructions 800 then terminate. Alternatively, the example instructions 800 may continue to collect program identification data for a third time period and/or indefinitely.

Figure 9A:
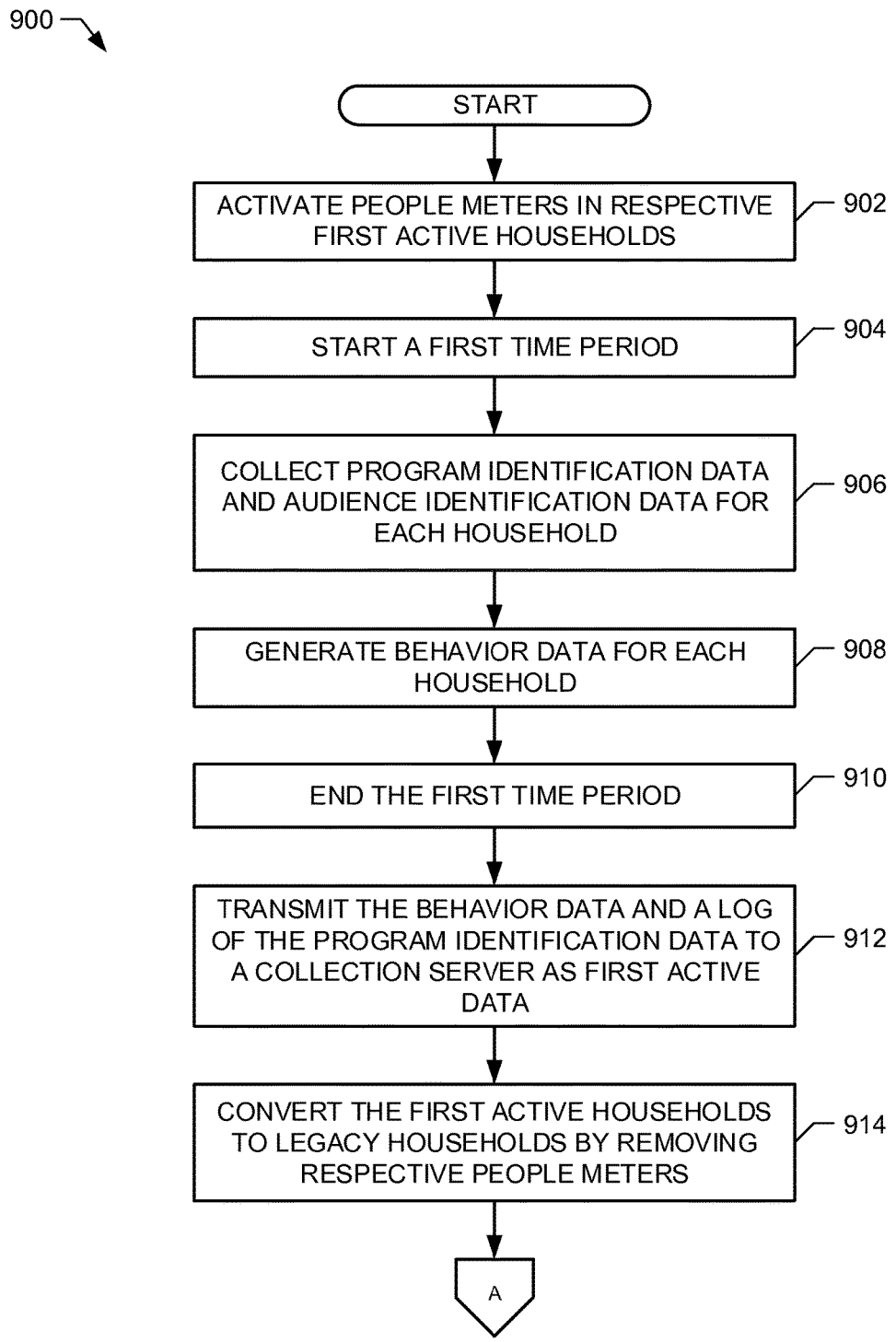
Figure 9B:
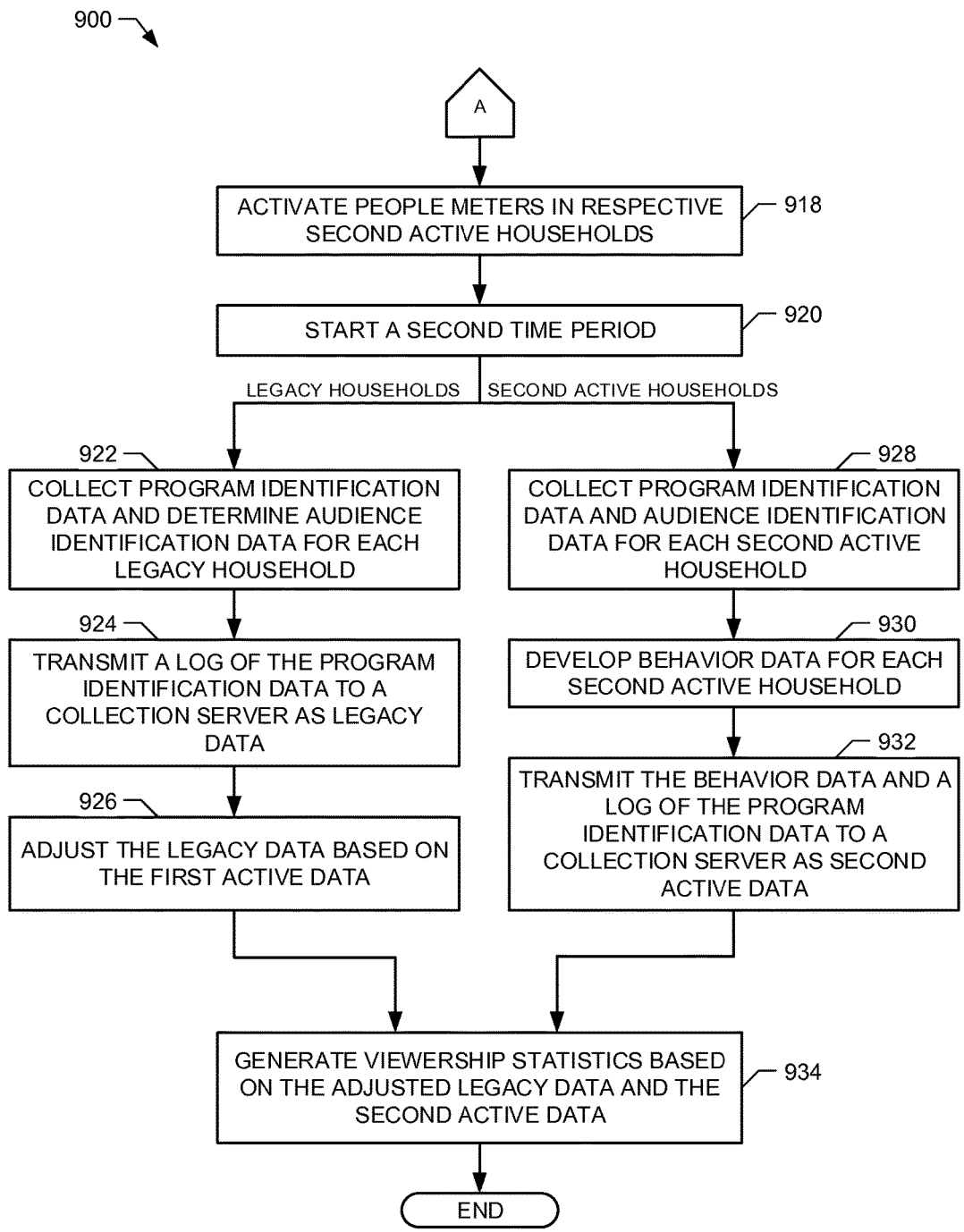

The example instructions 900 of FIGS. 9A and 9B collect behavior data during a first time period from a first set of households using a people meter and determine which audience members are viewing programming based on the behavior data during a second time period when the people meter is removed. The example instructions 900 also collect behavior data during the second time period for a second set of households using the people meter 110 and adjust the data collected from the two groups at the collection facility 124. Multiple instances of the example instructions 900 may be executed in parallel or series for different households. Additionally, multiple instances of the example instructions 900 may be executed in parallel or series for different regions of household groups.

The example instructions 900 of FIG. 9A begin by activating and/or installing people meters 110 in a first set of active households (block 902). The example instructions 900 then start a first time period (e.g., via the timers 503) (block 904). During this first time period, the example instructions 900 collect program identification data and audience identification data for each of the households in the first set (e.g., via the people meters 110 and the base metering devices 108) (block 906). Next, the example instructions 900 generate behavior data for each of the households within the first set based on the collected data (e.g., via the behavior processors 518) (block 908). The example instructions 900 then end the first time period (e.g., via the timers 503) (block 910) and transmit the behavior data, program identification data, and/or the audience identification data for each of the households within the first set to the collection facility 124 (block 912).

The example instructions 900 then convert the first set of active households into legacy households by removing and/or deactivating the people meters 110 (block 914). At this point, the behavior data collected during the first time period is used by the base metering devices 108 to determine which of the audience members 116 within each of the households is watching television programming. Next, the example instructions 900 of FIG. 9B activate people meters 110 and base metering devices 108 in a second set of active households that are different from the first set of active households (block 918). The example instructions 900 then start a second time period (e.g., via the timers 503) (block 920). The example instructions 900 then concurrently collect program identification data from two different sets of households (e.g., a legacy set without people meters 110 and a second active set with people meters 110).

For the legacy set of households, the example instructions 900 collect program identification data and determine which of the audience members 116 is watching the programming based on behavior data from the first time period (e.g., via the base metering devices 108) (block 922). The example instructions 900 then transmit the program identification data and the determined audience identification data to the collection facility 124 as legacy data (e.g., via the base metering device 108) (block 924). The example instructions 900 then adjust the legacy data based on previously received behavior data from the first time period (e.g., via the collection facility 124) (block 926).

For the second set of active households, the example instructions 900 collect program identification data and audience identification data (e.g., via the base metering devices 108 and the people meters 110) (block 928). Next, the example instructions 900 generate behavior data for each of the households within the second set based on the collected data (e.g., via the behavior processors 518) (block 930). The example instructions 900 then transmit the behavior data, the program identification data, and/or the audience identification data to the collection facility 124 (e.g., via the base metering devices 108) (block 932).

The example instructions 900 of FIG. 9B continue by generating viewership statistics based on the adjusted legacy data and the data from the second set of active households (e.g., via the collection facility 124) (block 934). Additionally, in some examples, the instructions 900 may adjust the legacy data by the data from the second set of active households. The example instructions 900 then terminate. Alternatively, the example instructions 900 may continue to collect behavior data, audience identification data, and/or program identification data from the legacy households, households within the second set, and/or additional households.

Figure 10:
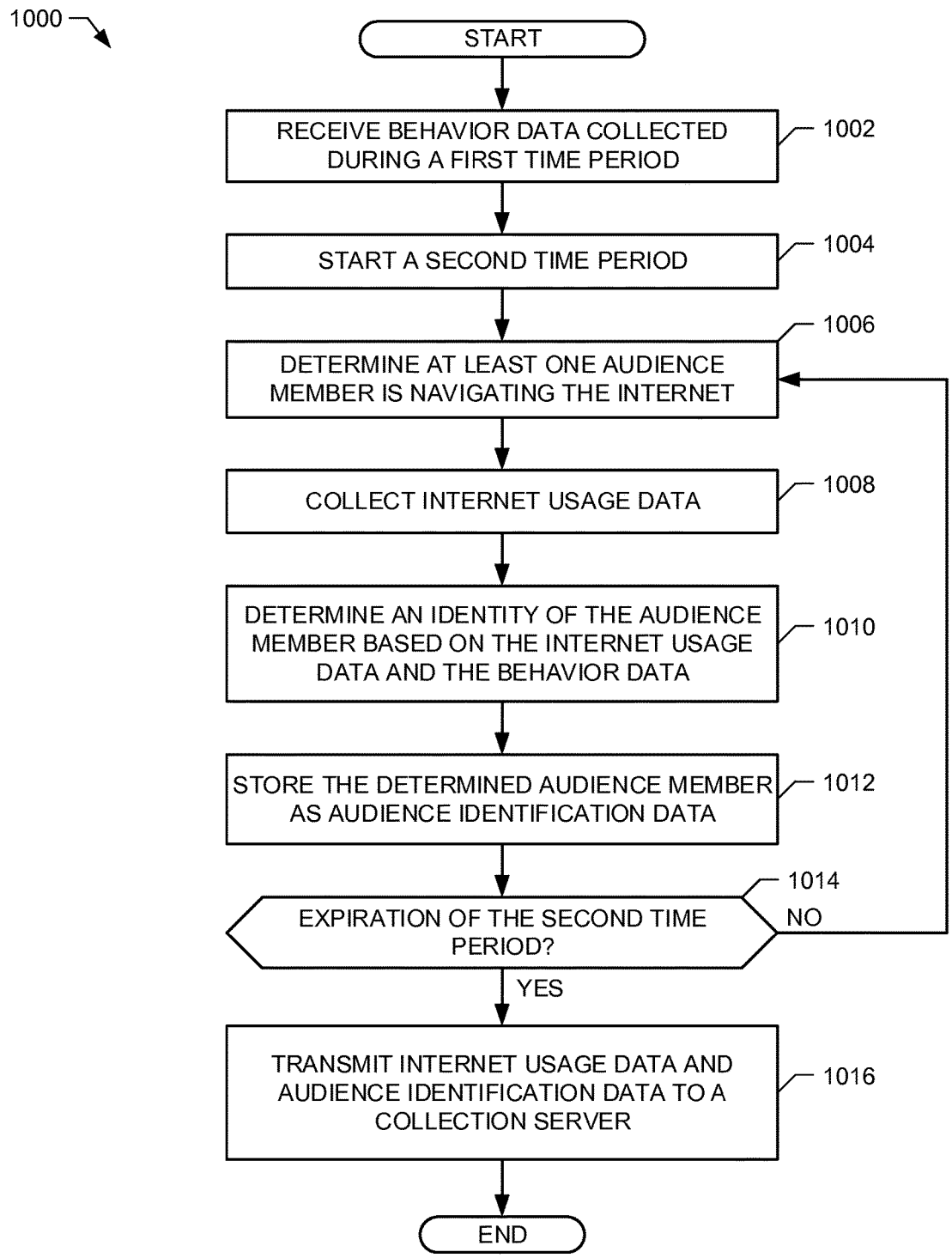

The example instructions 1000 of FIG. 10 collect Internet usage data during a second time period based on behavior data collected during a first time period with the people meter 110. Multiple instances of the example instructions 1000 may be executed in parallel or series for different households. Additionally, multiple instances of the example instructions 1000 may be executed in parallel or series for different base metering devices 108 within the same household.

The example instructions 1000 of FIG. 10 begin by collecting and/or receiving behavior data collected during a first time period (e.g., via the base metering device 108 and/or the people meter 110) (block 1002). The behavior data, in some examples, may include Internet usage data and corresponding audience identification data collected by the prompting audience members 116 within a household to self-identify when they use the Internet. The example instructions 1000 then start a second time period (e.g., via the timer 503) (block 1004).

During the second time period, the example instructions 1000 may determine that at least one of the audience members 116 within the monitored household is navigating and/or browsing the Internet using the computer 404 (e.g., via the monitoring application 406 of FIG. 4) (block 1006). Next, the example instructions 1000 collect Internet usage data (e.g., via the monitoring application 406) (block 1008). The example instructions 1000 then determine an identity of the audience member 116 by matching the Internet usage data to the behavior data (e.g., via the monitoring application 406 and/or the base metering device 108) (block 1010). The example instructions 1000 also store the determined identity of the audience member 116 as audience identification data and store the Internet usage data (e.g., via the monitoring application 406 and/or the base metering device 108) (block 1012).

The example instructions 1000 continue by determining if the second time period has expired (e.g., via the timer 503) (block 1014). If the second time period has not expired, the example instructions 1000 return to determining if at least one of the audience members 116 is navigating the Internet (block 1006). However, if the second time period has expired, the example instructions 1000 transmit the Internet usage data and/or the audience identification data to the collection facility 124 (block 1016). In other examples, the instructions 1000 may periodically transmit the Internet usage data and/or the audience identification data to the collection facility 124. The example instructions 1000 then terminate. Alternatively, the example instructions 1000 may continue to collect Internet usage data for a third time period and/or indefinitely.

Figure 11:
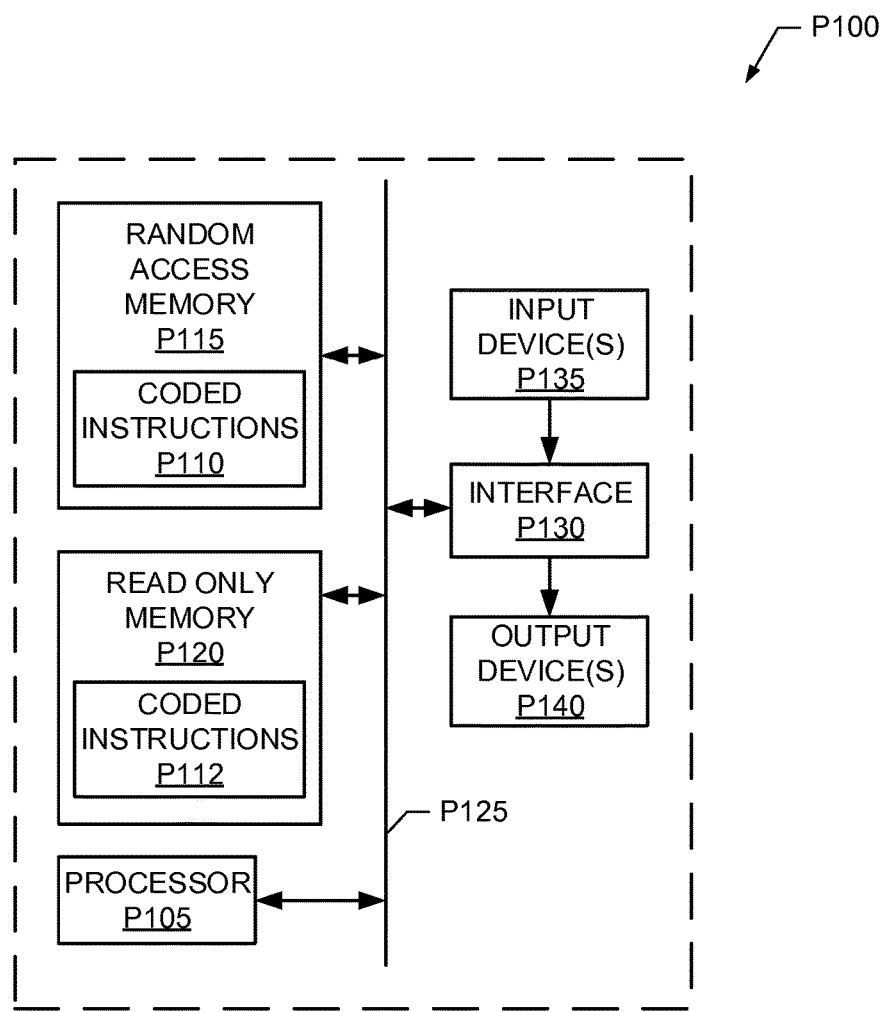
FIG. 11 is a schematic illustration of an example processor platform that may be used and/or programmed to execute the example processes and/or the example machine-accessible instructions of FIGS. 8A, 8B, 9A, 9B, and 10 to implement any or all of the example methods, apparatus and/or articles of manufacture described herein.

FIG. 11 is a schematic diagram of an example processor platform P100 capable of executing the instructions of FIGS. 8A, 8B, 9A, 9B, and/or 10 to implement the example processor 502, the example memory 504, the example communication interface 506, the example people meter interface 508, the example user interface 510, the example display 512, the example television programming measurement circuitry 514, the example sensors 516, the example behavior processor 518, and/or more generally, the example base metering device 108 of FIGS. 1-5. For example, the processor platform P100 can be implemented by one or more general-purpose processors, processor cores, microcontrollers, etc.

The processor platform P100 of the example of FIG. 11 includes at least one general purpose programmable processor P105. The processor P105 executes coded instructions P110 and/or P112 present in main memory of the processor P105 (e.g., within a RAM P115 and/or a ROM P120). The coded instructions P110 and/or P112 may be the instructions of FIGS. 8A, 8B, 9A, 9B, and/or 10. The processor P105 may be any type of processing unit, such as a processor core, a processor and/or a microcontroller. The processor P105 may execute, among other things, the example instructions of FIGS. 8A, 8B, 9A, 9B, and/or 10 to implement the example methods, articles of manufacture, and apparatus described herein.

The processor P105 is in communication with the main memory (including a ROM P120 and/or the RAM P115) via a bus P125. The RAM P115 may be implemented by DRAM, SDRAM, and/or any other type of RAM device, and ROM may be implemented by flash memory and/or any other desired type of memory device. Access to the memory P115 and the memory P120 may be controlled by a memory controller (not shown). One or both of the example memories P115 and P120 may be used to implement the example memory 504 of FIG. 5.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method of collecting audience measurement data in a monitored household, the method comprising:
   collecting first media data;
   collecting audience identification data with a people meter;
   developing, with a first processor, audience member behavior data based on the first media data and the audience identification data;
   collecting second media data after the people meter has been removed, the removal of the people meter occurring after the audience member behavior data has been developed; and identifying, with at least one of the first processor or a second processor, audience members associated with the second media data based on the audience member behavior data.

2. The method of claim 1, wherein the first media data is collected in association with a first media presentation of a first media system, and the second media data is collected in association with a second media presentation of a second media system different from the first media system.

3. The method of claim 2, wherein the first media system is a television, and the second media system is at least one of a computer, a cell phone, a smartphone, a laptop, or a tablet.

4. The method of claim 2, wherein the first media presentation is television media and the second media presentation is Internet media.

5. The method of claim 1, wherein the collecting of the second media data occurs without prompting the audience members to self-identify.

6. The method of claim 1, wherein the developing of the audience member behavior data occurs over a first time period that is more than one year.

7. The method of claim 1, wherein the audience member behavior data includes at least one of times of day, days of week, or media accessed by individual ones of the audience members.

8. The method of claim 1, wherein the identifying of the audience members associated with the second media data further includes obtaining demographic data for the identified audience members and associating the demographic data with the second media data to generate audience composition data.

9. The method of claim 1, wherein the collecting of the second media data extends a panelist term for the monitored household by eliminating button pushing.

10. The method of claim 1, wherein the first media data is collected via a base metering device, and the second media data is collected via a mailable meter without the people meter being present in the household.

11. An apparatus to collect audience measurement data comprising:
a people meter to collect audience identification data during a first time period;
a media measurement device to collect first media identification data during the first time period and second media identification data during a second time period after the first time period, the second media identification data collected without collecting audience measurement data from the people meter, the people meter removed during the second time period; and
a behavior processor to:
develop audience member behavior data based on the first media identification data and the audience identification; and
identify the audience members associated with the second media identification data based on the audience member behavior data.

12. The apparatus of claim 11, wherein the people meter does not collect the audience identification data and does not prompt audience members to self-identify during the second time period.

13. The apparatus of claim 11, wherein the media measurement device further includes a communication interface to collect Internet usage data without collecting audience identification data.

14. The apparatus of claim 13, wherein the behavior processor is to identify audience members associated with the Internet usage data based on the audience member behavior data.

15. A machine-readable storage device or storage disk comprising instructions which, when executed, cause a machine to at least:
develop audience member behavior data based on first media data and audience identification data collected with a people meter over a first time period;
collect second media data after the people meter has been removed, the removal of the people meter occurring after the audience member behavior data has been developed; and
identify audience members associated with the second media data based on the audience member behavior data and without collecting audience identification data.

16. The machine-readable storage device or storage disk as defined in claim 15, wherein the instructions, when executed, cause the machine to obtain demographic data for the audience members associated with the second media.

17. The machine-readable storage device or storage disk as defined in claim 15, wherein the instructions, when executed, cause the machine to identify the audience members associated with Internet usage based on the audience member behavior data.

18. A method of collecting audience measurement data in a monitored household, the method comprising:
collecting first media data via a base metering device;
collecting audience identification data with a people meter;
developing, with a first processor, audience member behavior data based on the first media data and the audience identification data;
collecting second media data after the people meter has been removed, the second media data collected by a service provider associated with the second media data, the removal of the people meter occurring after the audience member behavior data has been developed; and
identifying, with at least one of the first processor or a second processor, audience members associated with the second media data based on the audience member behavior data.

* * * * *